United States Patent [19]

Sawada

[11] Patent Number: 4,642,779
[45] Date of Patent: Feb. 10, 1987

[54] WRITING-PLOTTING APPARATUS WITH KEYBOARD

[75] Inventor: Akihiro Sawada, Nagoya, Japan
[73] Assignee: Brother Kogyo Kabushiki Kaisha, Aichi, Japan
[21] Appl. No.: 707,675
[22] Filed: Mar. 4, 1985
[30] Foreign Application Priority Data Mar. 12, 1984 [JP] Japan .................................. 59-47970

[51] Int. Cl.⁴ ............................ G01D 9/30; B41J 3/04
[52] U.S. Cl. ................................. 364/520; 346/33 R; 346/139 R; 400/17; 400/18
[58] Field of Search ................ 364/520, 900 MS File; 400/17, 18; 346/33 R, 139 R

[56] References Cited
U.S. PATENT DOCUMENTS

| | | | |
|---|---|---|---|
| 4,328,550 | 5/1982 | Weber | 364/900 |
| 4,435,772 | 3/1984 | Suzuki et al. | 364/520 |
| 4,527,918 | 7/1985 | Yamamoto et al. | 400/17 |
| 4,532,521 | 7/1985 | Onoda | 346/33 R |
| 4,567,565 | 1/1986 | Haselby et al. | 364/520 |

Primary Examiner—Errol A. Krass
Assistant Examiner—Danielle Laibowitz
Attorney, Agent, or Firm—Parkhurst & Oliff

[57] ABSTRACT

A writing-plotting apparatus with a keyboard capable of writing characters in a writing mode, and plotting graphs in a plotting mode, comprising a carriage carrying a writing instrument such a ball-point pen movable toward and away from a sheet of paper, a first memory for storing character pattern data representative of characters, a second memory for storing graphic pattern data representative of patterns of graphs, and a control device which, in the writing mode, reads out from the first memory the character pattern data corresponding to the operated character keys, and in the plotting mode, reads out from the second memory the graphic pattern data. The control device is responsive to the read-out character or graphic pattern data to control the operations of drives for feeding the paper along one axis, and reciprocating the carriage along another axis perpendicular to the one axis. The apparatus further comprises a display device which displays, in the writing mode, the keyed-in characters, and provides, in the plotting mode, messages relating to a procedure according to which data necessary to plot a graph is entered through the keyboard.

9 Claims, 14 Drawing Figures

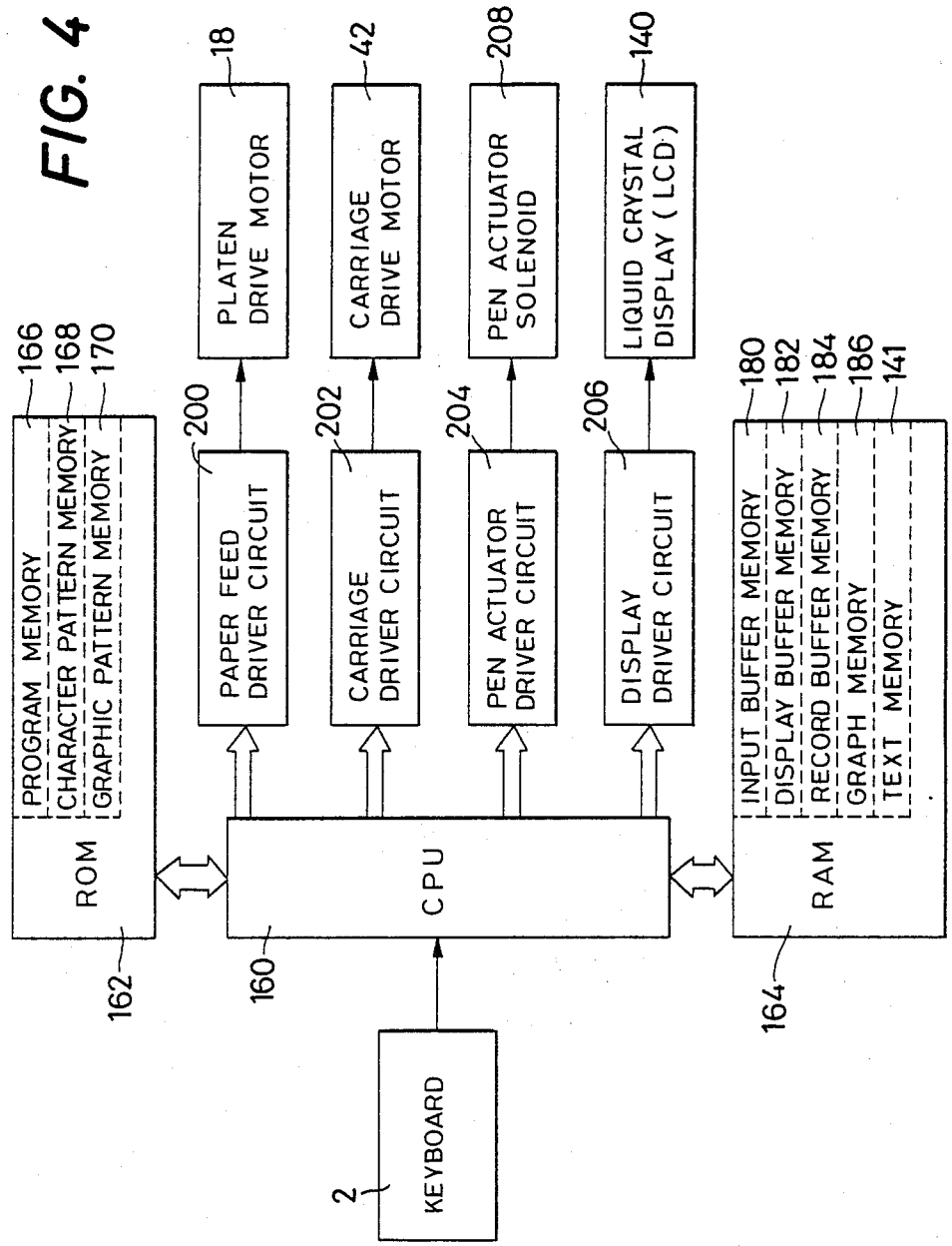

WRITING-PLOTTING APPARATUS WITH KEYBOARD

BACKGROUND OF THE INVENTION

The present invention relates to a recording apparatus with a keyboard, capable of writing characters or plotting graphs on a recording medium with suitable writing instruments.

A recording apparatus is known, wherein graphs are plotted or drawn on a sheet of paper by relative movements of the sheet of paper and a writing instrument such as a ball-point pen.

Such a known recording apparatus, however, is not capable of writing various characters such as letters, numerals and symbols, by operating the corresponding character keys, and plural function keys disposed on a keyboard as provided for an ordinary typewriter.

SUMMARY OF THE INVENTION

It is therefore an object of the present invention to provide a recording apparatus including a keyboard having multiple character keys, and function keys, and an assembly for effecting relative movements between a recording medium and a writing instrument such as a ball-point pen, which apparatus is selectively operable either in a writing mode to write characters, or in a plotting mode to draw graphs, and includes a single display device which perfoms different display functions corresponding to the writing and plotting modes, for facilitating both writing and plotting operations.

According to the invention, there is provided a recording apparatus capable of writing characters such as letters and symbols in a writing mode, and plotting graphs in a plotting mode, comprising: (a) a keyboard having character keys corresponding to the characters, and function keys; (b) a paper support member for supporting a sheet of paper; (c) a paper feeding device for feeding the sheet of paper in one of opposite directions; (d) a carriage supporting a writing instrument, and movable in a direction perpendicular to a line of feed of the sheet of paper; (e) a carriage driving device for reciprocating the carriage in said direction perpendicular to the line of feed of the paper; (f) a character pattern memory for storing sets of character pattern data representative of patterns of the individual characters; (g) a graphic pattern memory for storing at least one set of graphic pattern data representative of a graphic pattern; (h) control means which, in the writing mode, reads out from the character pattern memory the sets of character pattern data corresponding to the character keys operated, and in the plotting mode, reads out from the graphic pattern memory the graphic pattern data, the control means being responsive to the read-out character and graphic pattern data and controlling the operations of the paper feeding device and the carriage driving device; and (i) a display device which displays, in the writing mode, the characters keyed in through the character keys, and which provides, in the plotting mode, messages relating to a procedure according to which data necessary to plot a graph is entered through the keyboard.

In the recording apparatus constructed as described above, desired characters are written on the sheet of paper in the writing mode by operating the corresponding character keys, and necessary function keys as in an ordinary typewriter, while graphs are plotted in a selected graphic pattern on the sheet in the plotting mode by keying in desired numerical data through the keyboard.

While the recording apparatus is placed in the writing mode, the characters keyed in through the keyboard are displayed on the display device, so that the operator may check the keyed-in data for correct entry by observing the display on the display device.

When the recording apparatus is operated in the plotting mode, the display device provides messages indicating how to enter data necessary to plot a graph. These messages instruct the operator, in a conversational fashion, in the procedure to enter the data which the operator wishes to present in a graphical form.

Thus, the same display device serves two different display functions corresponding to the writing and plotting modes. The use of single display device adapted to the two different modes of operation reduces the cost of manufacture and simplifies the overall construction of the recording apparatus, when compared with an arrangement wherein two exclusive display devices are provided, one for the writing mode and the other for the plotting mode.

According to the invention, a ball-point pen may serve as the writing instrument, and each set of character pattern data representing each element of a character may comprise vector data representative of a vector having a magnitude and a direction, and pen-contact-/release data indicative of contact and release of the writing instrument with respect to the sheet of paper. The at least one set of graphic pattern data stored in the graphic pattern memory represents, for example, a pie chart (circular graph), a bar graph or a broken-line graph.

The keyboard may further includes mode selecting means for selecting the writing mode or the plotting mode, and the function keys include at least one key which performs one function in the writing mode, and another function in the plotting mode. The display device may be a liquid crystal display disposed on the keyboard.

According to an advantageous embodiment of the invention, the messages provided on the display device comprise a message asking the operator to select the desired graphic pattern (such as circular, bar or broken-line graph) in which the keyed-in numerical data are graphically presented.

According to a further advantagous embodiment, the messsages provided on the display device comprise messages asking the operator of the apparatus to enter numerical values to be presented in the graphical form, while simultaneously indicating ordinal numbers of the numerical values.

The control maens may comprise an input buffer memory for temporarily storing coded data which are keyed in through the keyboard, and a graph memory for storing numerical data which are used in combination with the appropriate set of graphic pattern data stored in the graphic pattern memory. The keyboard may inclue an enter key for transferring coded numerical data from the input buffer memory to the graph memory, and a start key for starting the plotting of the numerical data stored in the graph memory. The control means clears the graph memory when the mode selector means is operated after the operation of the enter key and before the operation of the start key.

BRIEF DESCRIPTION OF THE DRAWING

These and other objects and many attendant advantages of this invention will be readily appreciated as the same becomes better understood by reference to the following detailed description when considered in connection with the accompanying drawing, in which:

FIG. 4 is a block diagram of a control system for the recording apparatus of FIG. 1;

FIG. 5 is an illustration showing an example of indication on a liquid crystal display provided on the apparatus;

FIG. 7 shows an example of a message provided on the liquid crystal display;

FIG. 8 represents various graphical patterns corresponding to numeral keys by which the patterns are selected, respectively;

FIGS. 9 through 14 are views showing different indications on the liquid crystal display during operation of the apparatus.

DETAILED DESCRIPTION OF THE PREFERRED EMBODIMENT

Referring to the accompanying drawing, a preferred embodiment of the invention will be described in detail.

Figure 1:
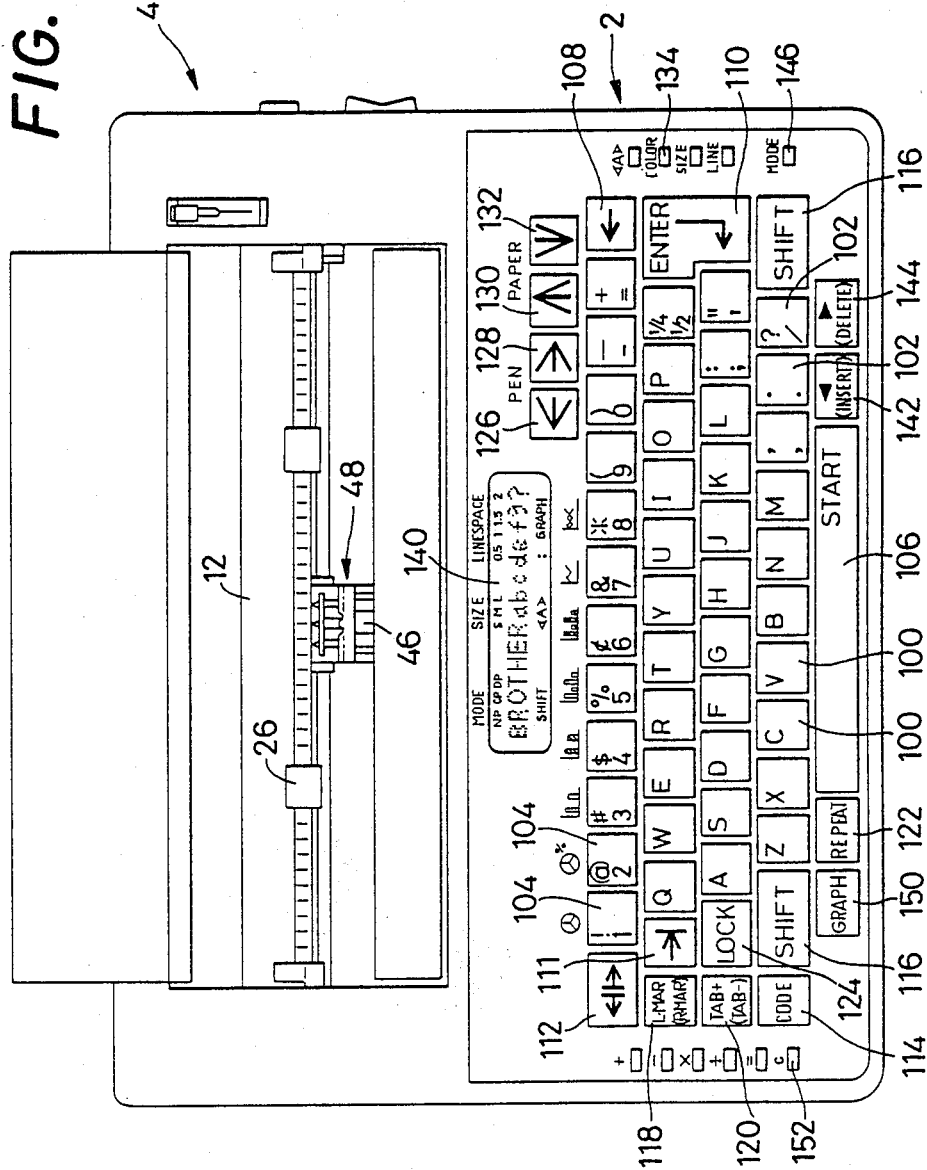
FIG. 1 is a schematic plan view of one embodiment of a recording apparatus of the invention having a keyboard and using ball-point pens as writing instruments.

In a plan view of FIG. 1, there is shown one embodiment of a recording apparatus of the invention which uses ball-point pens (described later) as writing instruments. The recording apparatus has a keyboard 2 at its front half, and a recording section 4 at its rear half. A recording mechanism of the recording section 4 is schematically illustrated n FIG. 2, wherein reference numerals 10 designate a pair of opposed side frames of a main housing structure ofthe appartus. These side frames 10 support rotatably a shaft 14 of an elongate cylindrical platen 12 which serves as a paper support member. The shaft 14 has a gear 16 fixed to one end thereof. The gear 16 meshes with a pinion 20 which is fixed to an output shaft of a platen drive motor 18. The platen 12 is rotated by an angular amount as needed, by the motor 18 in selected one of opposite directions, i.e., either forward or reverse direction. The platen 12 cooperates with a paper pan 22, presser rollers 23, a paper guide 24, paper bail rollers 26, and other parts, to move, guide and support a sheet of recording paper 28 along the circumferential surface of the platen 12. Thus, the platen 12, gear 16, motor 18, pinion 20, paper pan 22, presser rollers 23, paper guide 24, and paper bail rollers 26 constitute a major part of a paper feeding device 30 for feeding the sheet of paper 28 in the Y-axis direction perpendicular to an axis of rotation of the platen 12.

Two mutually parallel guide rods 32, 34 extend in parallel with the platen 12 between the opposed side frames 10. These two guide rods 32, 34 support a carriage 30 slidably along the length of the rods 32, 34. A carriage drive wire 38, which is fixed at its opposite ends to the carriage 36, is guided in a loop by four idler guide rollers 40. The drive wire 38 is wound on a driven pulley 44 fixed to an output shaft of a carriage drive motor 42. With bidirectional rotary movements of the drive motor 42, the loop of the drive wire 38 is rotated in the corresponding directions, whereby the carriage 36 is reciprocated in opposite directions along the axis of the platen 12, i.e., in the X-axis direction perpendicular to the Y-axis along which the sheet of paper 23 is fed by the paper feeding device 30. The carriage 36 carries a multi-station indexable pen-holding head 48 which supports plural ball-point pens 46. In this arrangement, the ball-point pens 46 are moved in the X-axis direction when the carriage 36 is reciprocated. The guide rods 32, 34, carriage 36, drive wire 38, guide rollers 40, carriage drive motor 42, and pulley 44 constitute a major part of a pen driving device 50 for moving the ball-point pens 46 in the X-axis direction. With the X-axis movements imparted to the pens 46 by this driving device 50, in combination with the Y-axis movements of the sheet of paper 28 imparted by the paper feeding device 30, the pens 46 are movable in any directions relative to the sheet of paper 28, whereby desired characters such as letters and symbols, and desired graphs may be recorded, i.e., written or plotted on the sheet of paper 28.

Figure 3:
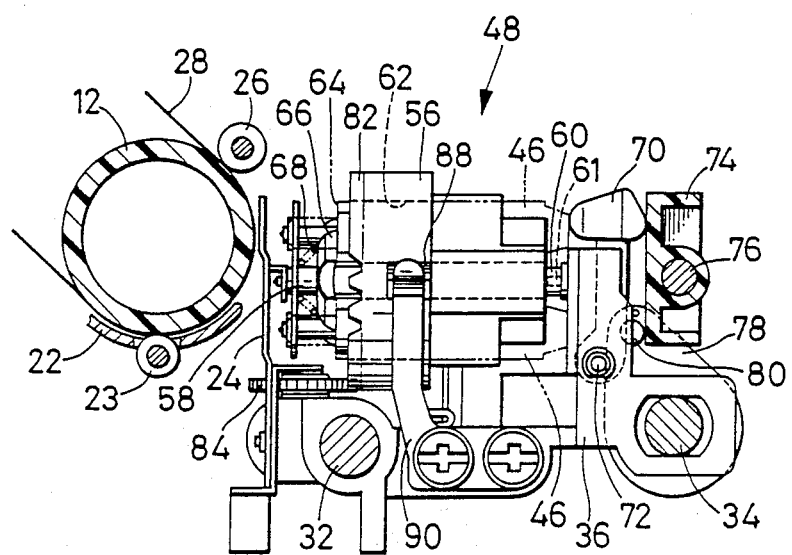
FIG. 3 is an enlarged elevational side view partly in cross section of a pen-holding head and is vicinities.

The multi-station indexable pen-holding head 48 is constructed as shown in FIG. 3. The pen-holding head 48 includes a holder body 56 which is supported on the carriage 36 rotatably or indexably about its axis substantially perpendicular to the axis of the plate 12. Stated more particularly, the pen holder body 56 has a short shaft 58 extending from its one end on the side of the platen 12, and a boss 60 formed at its other end. The short shaft 58 is rotatably supported by the paper guide 24, while a projection 61 extending from the carriage 36 is fitted in a recess formed in the boss 60 of the holder body 56. Thus, the holder body 56 is rotatably supported on the carriage 36. The holder body 56 has four pen holes 62 which are formed in evenly spaced-apart relation with each other circumferentially of the holder body 56. In other words, the pen holdes 62 are equiangularly spaced from each other along a circle whose center is alinged with the axis of rotation of the holder body 56. The four pen holes 62 accommodate the respective four ball-point pens 46 of different colors so that they are axially slidable in the holes 62. Thus, the holder body 56 carries the four ball-point pens 42. The end portion of each pen 46 on the side of its writing tip is smaller in diameter than the remaining portion, and terminates at a shoulder 64 on which a biasing force of a return spring 68 is exerted via a commonly used return plate 66.

A hammer 70 is disposed behind the holder body 56, and supported on the carriage 36 pivotably about a pin 72. Behind the hammer 70 is disposed a hammer drive plate 74 which is pivotable about a shaft 76. In the meantime, the guide rod 34 has a lever 78 fixed thereto, and the lever 78 has a pin 80 fixed thereto. When the guide rod 34 is rotated upon activation of a latching solenoid 208 (FIG. 4) connected thereto, the hammer drive plate 74 is pivoted counterclockwise (as seen in FIG. 3) by the pin 80, and consequently the hammer 70 is pivoted in the same direction. As a result, the hammer 70 advances the currently selected ball-point pen 46 against the biasing force of the return spring 68 until the writing tip of the pen 46 contacts the surface of the sheet of paper 28. At this time, the return plate 66 is flexed by a predetermined angle to permit the pen 46 to advance.

Figure 2:
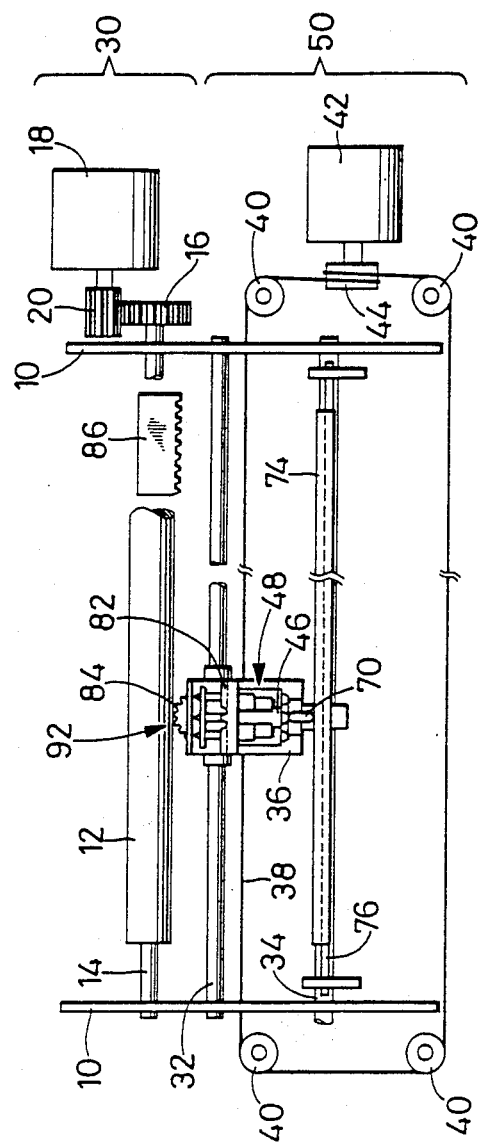
FIG. 2 is a schematic plan view in enlargement of a recording mechanism of the recording apparatus of FIG. 1.

When one of the four ball-point pens 46 supported by the holder body 56 is selected, the holder body 56 is indexed so that the selected pen 46 is located at the uppermost position, i.e., the writing position at which the axis of the pen 46 is substantially normal to the surface of the platen 12, and at which the pen 46 is advanced by the hammer 70. The holder body 56 is provided, at its front end on the side of the platen 12, with an integrally formed gear 82 which meshes with a pinion 84 supported on the carriage 30 rotatably about a vertical axis. As shown in FIG. 2, a stationary rack 86 is disposed adjacent to the right-hand side end (as viewed in FIG. 2) of the plate 12. Each time the carriage 36 is moved to the right-hand side end of the platen 12, the pinion 84 engages with the rack 86 and is rotated by the rack 86, whereby the holder body 56 is indexed by a quarter turn. The rack 86 is movable by a mechanism not shown, between its operative position for engagement with the pinion 84, and its inoperative position at which the rack 86 is not engageable with the pinion 84. The rack 86 is placed in its operative position when the carriage 36 is moved in one direction, but placed in its inoperative retracted position when the carriage 36 is moved in the opposite direction. Accordingly, the holder body 56 is indexed or rotated by a quarter turn each time the carriage 36 is reciprocated to and from the right-hand side end of the plate 12. In this manner, the four ball-point pens 46 of different colors are brought into the writing position (uppermost position on the holder body 56) in the predetermined order. The holder body 56 is provided, in its outer circumference, with four vee-notches 88 which are equiangularly spaced from each other circumferentially of the holder body 56. In the meantime, a positioning spring member 90 is fixed to the carriage 36, so that the free end of the spring member 90 engages on of the four vee-notches 88 and thereby accurately establishes the writing position of the holder body 56. In the instant embodiment, the holder body 56, gear 82, pinion 84, rack 86 and spring member 90 constitutes a major part of a pen indexing device 92.

Referring back to FIG. 1, the keyboard 2 will be described in detail. The keyboard 2 has character keys which include a multiplicity of alphabetic keys 100, symbol keys 102 and numeral keys 104, and further has a multiplicity of function keys which include a space key (space bar) 106, a backspace key 108, a carriage return key 110, a tab key 111, a margin release key 112, a CODE key 114, a SHIFT key 116, a margin set key 118, a tab set key 120, a REPEAT key 122, and a LOCK key 124. Reference numerals 126 and 128 designate carriage-jog keys for moving the carriage 36, i.e., the ball-point pens 46 to the left and to the right, respectively, along the X-axis. Reference numerals 130 and 132 designate platen-job keys for rotating the platen 12, i.e., for feeding the sheet of paper 28 upward and downward, respectively, along the Y-axis. Reference numeral 134 desginates a color selector key for selecting the color of an ink of the ball-point pen 46, i.e., for selecting one of the four ball-point pens 46 of different colors.

In an upper central part of the keyboard 2, there is provided a liquid crystal display 140, which displays keyed-in characters in such a manner that the already displayed characters are shifted one position to the left each time a new character is keyed in through the character keys. When a WRITING mode is selected, the recording apparatus is operated in one of three different writing modes: a non-print mode; a correction print mode; and a direct print mode. In the non-print mode, the keyed-in data are displayed on the liquid crystal display 140 and are stored in a text memory 141, but not recorded on the sheet of paper 28. In the correction print mode, the recording of the keyed-in characters is effected only after the display 140 is overflowed. In this mode, it is possible to edit or correct the keyed-in characters as long as they are displayed on the display 140. To correct an error of entry, a cursor of the display 140 is moved to the position corresponding to the erroneously entered data, and then the correction is made by using an INSERT key 142 and/or a DELETE key 144. In the correction print mode, the keyed-in characters are written by the selected pen 46 in the order of overflow from the liquid crystal display 140. In the direct print mode, the characters are written when they are keyed in, in the same manner as they are printed in an ordinary typewriter. In this mode, too, the keyed-in characters are displayed on the liquid crystal display 140, so that the operator may check the keyed-in characters on the display 140. A desired one of these three writing modes is selected by a MODE key 146.

The WRITING mode is switched to a PLOTTING mode by pressing a GRAPH key 150 located adjacent to the lower left-hand side corner of the keyboard 2. Described more specifically, the mode of operation of the recording apparatus is changed alternately between the WRITING and PLOTTING modes each time the GRAPH key 150 is pressed. Thus, the GRAPH key 150 serves as a mode selector key for selecting the WRITING or PLOTTIG mode. While the recording apparatus is placed in the PLOTTING mode, the liquid crystal display 140 provides a message asking the operator to select a desired graphic pattern, such as a circular graph (a pie chart), a bar graph, or a broken-line graph, in which numerical data is graphically represented. The desired graphic pattern is selected by the corresponding one of the numeral keys 104. After the graphic pattern is selected, the numeral keys 104 are used, if necessary with the decimal point key (one of symbol keys) 102, to enter the numerical values which are to be presented in the selected graph. In the PLOTTIG mode, some of the function keys serve functions which are different from their functions attained when they are operated in the WRITING mode. For example, the carriage return key 110, when operated in the PLOTTING mode after the entry of numerical values through the numeral keys 102, serves as an ENTER key for storing these numerical values as the numerical data for graphical representation in the selected graphic pattern. Further, if the space bar 106 is operated after up to twelve numerical values are stored in the PLOTTING mode, the space bar 106 serves as a START key for starting the plotting of the stored numerical values on the sheet of paper 28. In this connection, it is noted that the already keyed-in numerical data may be erased by operating a clear key 152 before the START key (carriage return key) 110 is operated.

The recording section 4 of the recording apparatus is controlled by a control system shown in FIG. 4, according to signals from the keyboard 2 which has been described. In the figure, reference numeral 160 designates a central processing unit (hereinafter referred to as CPU), to which is connected the keyboard 2 which serves as data input means. Also connected to the CPU 160 are a read only memory (hereinafter referred to as ROM) 162 and a random access memory (hereinafter called RAM) 164. The ROM 162 includes a program memory 166 storing programs shown in FIG. 6, and other programs for controlling the operation of the recording apparatus. The ROM 94 further includes a character pattern memory 168 which stores sets of character pattern data representative of patterns of the characters which correspond to the character keys on the keyboard 2, and a graphic pattern memory 170 which stores sets of graphic pattern data representative of graphic patterns which are designated by the appropriate numeral keys 104, as described later in detail.

Each set of character pattern data representing a character comprises plural bytes each of which consists of eight bits and corresponds to each element or segment of the character. The low-order three bits (as counted from the least significant bit) are vector-direction data representative of a direction of a vector which defines the corresponding segment of the character. The next bit (fourth bit from LSB) is pen-contact-/release data which indicates contact or release of the selected pen 46 with respect to the sheet of paper 28. The next three bits are vector-magnitude data representative of a magnitude of the vector which corresponds to the length of the segment. The most significant bit (MSB) is end data which indicates whether the byte involved represents the last segment of the character, or not. In the meantime, the graphic pattern memory 170 stores sets of graphic pattern data representative of basic graphic patterns of various kinds of graphs such as circular graphs (pie charts), broken-line graphs and bar graphs.

The RAM 176 includes: an input buffer memory 180 for temporarily storing coded data which are keyed in through the keyboard 2; a display buffer memory 182 for temporarily storing coded data for the characters to be displayed on the liquid crystal display 140; a record buffer memory 184 for temporarily storing coded data for the characters to be recorded by the recording section 4; a graph memory 186 for storing numerical data which are used in combination with the appropriate set of graphic pattern data stored in the graphic pattern memory 170, to provide a desired graphical presentation of the corresponding numerical values; and other memories including the previously indicated text memory 141 for storing a relatively large batch of keyed-in coded data entries. the RAM 164 further includes various counters and registers for executing the programs stored in the program memory 166 of the ROM 162.

There is also connected to the CPU 160 a paper feed driver circuit 200, a carriage driver circuit 202, a pen actuator driver circuit 204, and a display driver circuit 206, to which are respectively connected the platen drive motor 18, carriage drive motor 42, solenoid 208, and liquid crystal display 140. The solenoid 208 is used to rotate the guide rod 34 (FIG. 3) by a small angle clockwise and counterclockwise, to move the currently selected ball-point pen 46 between its advanced (contact) and retracted (release) positions with respect to the sheet of paper 28.

As is apparent from the foregoing description, the present embodiment of the recording apparatus uses a writing and plotting control arrangement which comprises the keyboard 2, CPU 160, ROM 162, RAM 164, paper feed driver circuit 200, carriage driver circuit 202, etc.

When the appropriate character keys (alphabetic keys 100, symbol keys 102, numeral keys 104) on the keyboard 2 are operated in combination with the appropriate function keys while the recording apparatus is placed in the WRITING mode, the corresponding coded data are fed to the CPU 160. In response to these coded data, the CPU 160 reads out from the character pattern memory 168 the sets of character pattern data corresponding to the coded data received from the keyboard 2, and controls the operations of the paper feed driver circuit 200, carriage driver circuit 202 and pen actuator driver circuit 204 to write the characters which have been keyed in through the character keys. At the same time, the CPU 160 controls the display driver circuit 206, according to the character pattern data, to display the keyed-in characters on the liquid crystal display 140, as illustrated in FIG. 5. The characters displayed on the display 140 are shifted one position to the left each time a new character is keyed in through the keyboard 2. Since the control of this character shifting on the display is well known in the art, no detailed description thereof is provided herein.

When the WRITING mode is switched to the PLOTTING mode, the function of the liquid crystal display 140 is changed. In other words, the function of the liquid crystal display 140 in the PLOTTING mode is different from its function performed in the WRITING mode. This aspect of the display 140 will be described in greater detail with reference to FIGS. 6–14.

Figure 6:
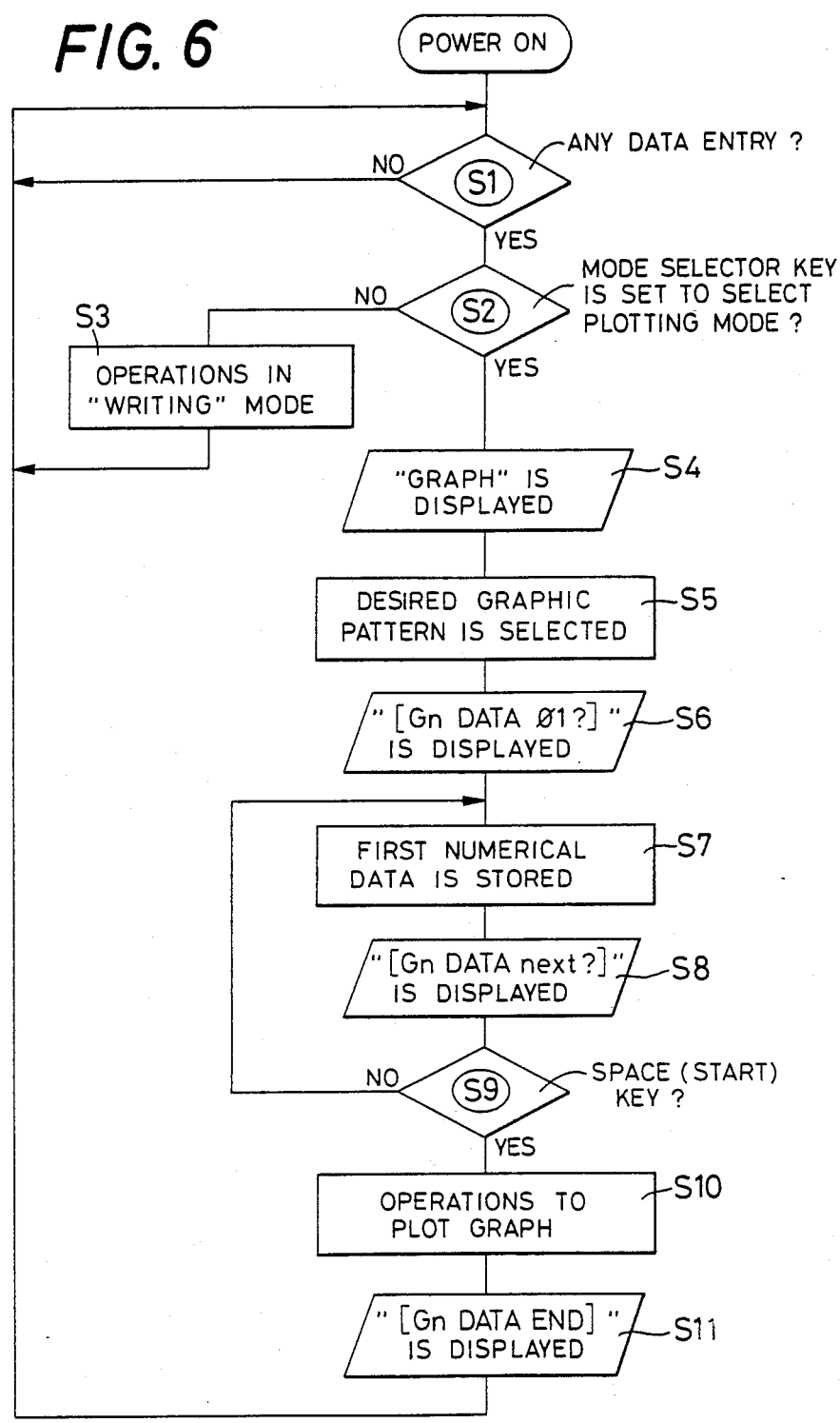
FIG. 6 is a flow chart representing a part of a control program associated with the control of the liquid crystal display.

Reference is first made to a flow chart of FIG. 6 which depicts the outline of a program to control the liquid crystal display 140 while the present recording apparatus is operated in the PLOTTING mode. Upon application of power to the recording apparatus, the CPU 160 executes an initializing routine, and then goes to Step S1 which is repeatedly executed to check if any key on the keyboard 2 is operated. When any data is entered through the keyboard 2, step S2 is executed to check if the entered coded data corresponds to the GRAPH key 150 (mode selector key), that is, to check if the GRAPH key 150 has been operated to select the PLOTTING mode. If the judgement in step S2 is negative (NO), step S2 is followed by step S3 wherein the WRITING mode of operation is effected according to the entered data, in the manner as previously discussed. If the judgement in step S2 is affirmative (YES), i.e., if the PLOTTING mode is selected, step S2 is followed by step S4 wherein the liquid crystal display 140 provides a message "GRAPH?" as shown in FIG. 7. Stated more specifically, the CPU 160 reads out from the character pattern memory 168 the character pattern data corresponding to the characters "G", "R", "A", "P", "H" AND "?", and feeds the corresponding data to the display driver circuit 206 to cause the display 140 to display the message "GRAPH?". This message is provided to ask the operator to select one of the several graphic patterns which are available on the recording apparatus.

Described more particularly, eight graphic patterns as indicated in FIG. 8 are available, which are: a circular graph (pie chart); a circular graph with percent indication; a bar graph; a hatched-bar graph; a bar graph with two groups of bars representing two groups of numerical data; a hatched-bar graph with two groups of bars; a broken-line graph; and a broken-line graph with two broken lines representing two groups of numerical data. When the message "GRAPH?" is displayed on the diaplay 140, the operator selects the desired one of these eight graphic patterns by using the appropriate one of the numeral keys 104 corresponding to digits "1" through "8". These eight numerical keys 104 are assigned to the eight graphic patterns as shown in FIG. 8. Upon selection of the desired graphic pattern by the appropriate numeral key 104, the display 140 displays the corresponding digit or numeral, for example, "4", as illustrated in FIG. 9, if the hatched bar graph pattern is selected. The display of the corresponding digit enables the operator to check if the desired graphic pattern has been correctly selected. After this checking, the operator operates the ENTER key 110 (which is the carriage return key 110, and hereinafter called "ENTER key 110").

In response to the operation of the ENTER key 110, the CPU 160 goes to step S5 to store in the graph memory 186 the data representing the selected graphic pattern, and then to step S6 wherein the message "G4 DATA 01?" appears on the liquid crystal display 140, as shown in FIG. 10. This message indicates that the fourth graphic pattern, i.e., hatched-bar graph, is now selected, and asks the operator to enter a first set of numerical data which is presented in the selected hatched-bar graph.

The operator, who observes the message "G4 DATA 01?", keys in the first numerical value through the appropriate numeral key or keys 104, and the decimal point symbol key 102 if necessary. As a result, the display 140 displays the individual digits of an entered numerical value, e.g. "750", which digits are displayed in the order of entry, as illustratd in FIG. 11. After the desired numerical data has been entered, the operator operates the ENTER key 110, and the CPU 160 executes step S7 to transfer the entered first numerical data from the input buffer memory 180 to the graph memory 186.

Successively, the CPU 160 goes to step S8 wherein the display 140 provides a message "G4 DATA 02?", as illustrated in FIG. 12, asking the operator to enter the second set of numerical data. The operator then keys in the second numerical value and operates the ENTER key 110. In the next step S9, the CPU 140 checks to see if the START key 106 (space bar 106) has been operated or not. At this point of time in the sequence of operation in the PLOTTING mode, the ENTER key 110 has just been operated in the preceding step S8 (START key 106 has not been operated), and therefore the judgement in step S9 is negative (NO). As a result, the CPU 160 goes back to step S7 to store the secondly entered numerical data in the graph memory 186. In this manner, all numerical values that are to be presented in the selected graphic pattern (hatched-bar graph in this example), are stored in the graph memory 186 by repeating steps S7 through S9.

If a graphic pattern or a numerical value has been erroneosuly keyed in and the corresponding erroneous data are displayed on the display 140, the keyed-in data may be deleted by operating the clear key 152 prior to the operation of the ENTER key 110. Stated the other way, the erroneously keyed-in data can be deleted by the clear key 152 as long as the data is displayed on the diaplay 140. If it is desired to delete the keyed-in data after the ENTER key 110 has been operated, the keyed-in data may be deleted by operating the GRAPH key (mode selector key) 150 to change the mode of operation from the PLOTTING mode to the WRITING mode. In this case, all data stored in the graph memory 186 are deleted. The PLOTTING mode of operation can be re-started by operating the GRAPH key 150 again.

When all numerical values that are to be presented in the selected graphic pattern have been stored in the graph memory 186 by repetitive execution of steps S7 through S9 as previously discussed, the operator depresses the START key 106 (which is the space key). At this time, the judgement in step S9 becomes affirmative (YES), and the CPU 160 goes to the next step S10. In this step S10, the graphic pattern data corresponding to the selected graphic pattern (hatched-bar graph in this example) is read out from the graphic pattern memory 170, and the numerical data are read out from the graph memory 186. According to these graphic pattern data and the numerical data, the CPUY 160 controls the operations of the paper feed driver circuit 200, carriage driver circuit 202 and pen actuator driver circuit 204, so that the entered numerical values are presented in the selected graphic pattern. Upon completion of the plotting operation in step S10, the CPU 160 goes to step S11 wherein the display 140 provides a message, for example, "G4 DATA END", as shown in FIG. 13, which informs the operator that the plotting operation is completed.

The aforementioned steps of operation in the PLOTTING mode relate to a plotting operation which is performed when the selected graphic pattern is not a graph for presentation of two groups of numerical values. In the case where one of the graphic patterns for presentation of two groups of numerical data is selected by the respective numeral keys 104 corresponding to numerals "5", "6" and "8", a first group of numerical values are stored and plotted in the same manner as previously described. Upon completion of the plotting of this first group of numerical values in step S10, the CPU 160 executes a step to cause the display 140 to provide the message similar to that shown in FIG. 10. That is, the CPU 160 goes back to step S6. Therefore, the second group of numerical data may be stored by using the numeral keys 104 and other keys. In this connection, it is noted that the number of numerical values of the first group must be equal to that of the second group. If the number of numerical values of the second group exceeds the number of numerical values of the first group, the liquid crystal display 140 provides a message, for example, "G5 DATA END" as illustrated in FIG. 14, when a numerical value whose ordinal number is identical to that of the last numerical value of the first group has been stored. After all numerical values of the second group have been stored, the START key (space bar) 106 is operated in step S9, which is then followed by step S10 to plot the second group of numerical values. Upon completion of this plotting of the second group of numerical values, the message as shown in FIG. 14 is provided on the display 140 to inform the operator that the plotting operation of the two groups of numerical data has been completed.

While the present invention has been described in its preferred embodiment, it is to be understood that the invention is not confined thereto, and it will be obvious to those skilled in the art that various changes, modifications and improvements may be made without departing from the scope of the invention defined in the appended claims. For example, the liquid crystal display 140 may be replaced by other suitable display devices, and the aforementioned program to control the display may be modified as needed. Further, it is possible to change or modify the recording mechanism or system of the apparatus and its control system.

What is claimed is:

1. A recording appartus capable of writing characters such as letters and symbols in a writing mode, and plotting graphs in a plotting mode, comprising:
- a keyboard having character keys corresponding to said characters, and function keys;
- a paper support member for supporting a sheet of paper;
- a paper feeding device for feeding said sheet of paper in one of opposite directions;
- a carriage supporting a writing instrument, and movable in a direction perpendicular to a line of feed of said sheet of paper;
- a carriage driving device for reciprocating said carriage in said direction;
- a character pattern memory for storing sets of character pattern data representative of patterns of said characters;
- a graphic pattern memory for storing at least one set of graphic pattern data representative of a graphic pattern;
- control means which, in said writing mode, reads out from said character pattern memory the sets of character pattern data corresponding to the character keys operated, and in said plotting mode, reads out from said graphic pattern memory said graphic pattern data, said control means being responsive to the read-out character and graphic pattern data and controlling the operations of said paper feeding device and said carriage driving device; and
- a display which displays, in said writing mode, the characters keyed in through said character keys, and which provides, in said plotting mode, messages relating to a procedure according to which data necessary to plot a graph is entered through said keyboard.

2. The recording apparatus of claim 1, wherein said writing instrument comprises a ball-point pen.

3. The recording apparatus of claim 1, wherein each of said sets of character pattern data comprises vector data representing each element of each of said characters as a vector having a magnitude and a direction, and further comprises pen-contact/release data for contact and release of the writing instrument with respect to the sheet of paper.

4. The recording apparatus of claim 1, wherein said at least one set of graphic pattern data represents one of a pie chart, a bar graph and a broken-line graph.

5. The recording apparatus of claim 1, wherein said keyboard further includes mode selecting means for selecting one of said writing and plotting modes, and said function keys include at least one key which performs one function in said writing mode, and another function in said plotting mode.

6. The recording apparatus of claim 5, wherein said control means comprises an input buffer memory for temporarily storing coded data which are keyed in through said keyboard, and a graph memory for storing numerical data which are used in combination with the appropriate set of graphic pattern data stored in said graphic pattern memory, said keyboard including an enter key for transferring coded numerical data from said input buffer memory to said graph memory, and a start key for starting the plotting of the numerical data stored in said graph memory, said control means clearing said graph memory when said mode selector is operated after the opertion of said enter key and before the operation of said start key.

7. The recording apparatus of claim 1, wherein said display device comprises a liquid crystal display disposed on said keyboard.

8. The recording apparatus of claim 1, wherein said messages provided on said display device comprise a message asking the operator to select the graphic pattern in which said graph is plotted.

9. The recording apparatus of claim 1, wherein said messages provided on said display device comprise messages asking the operator of the apparatus to enter numerical values to be expressed in said graph, while simultanously indicating ordinal numbers of said numerical values.

* * * * *